United States Patent [19]
Halverson et al.

[11] Patent Number: 5,936,622
[45] Date of Patent: Aug. 10, 1999

[54] METHOD AND COMPUTER PROGRAM PRODUCT FOR DISPLAYING VISUAL THRESHOLD SETTING INDICATORS AND THRESHOLD ACTIVATION INDICATORS

[75] Inventors: Steven Gene Halverson, Rochester; Jeffrey Michael Ryan, Byron; Mark Steven Shade, Rochester, all of Minn.

[73] Assignee: International Business Machines Corporation, Armonk, N.Y.

[21] Appl. No.: 08/784,716

[22] Filed: Jan. 16, 1997

[51] Int. Cl.[6] ..................................................... G06F 15/00
[52] U.S. Cl. ........................... 345/339; 345/134; 345/140; 345/340; 345/965; 345/970
[58] Field of Search ..................................... 345/339, 340, 345/348, 349, 965, 970, 134, 140, 440

[56] References Cited

U.S. PATENT DOCUMENTS

| | | | |
|---|---|---|---|
| 5,136,690 | 8/1992 | Becker et al. | 345/349 |
| 5,309,556 | 5/1994 | Sismilich | 345/349 |
| 5,375,199 | 12/1994 | Harrow et al. | 345/339 |

FOREIGN PATENT DOCUMENTS 2224370  2/1990  United Kingdom.

*Primary Examiner*—Huynh Ba
*Attorney, Agent, or Firm*—Joan Pennington

[57] ABSTRACT

A method and computer program product are provided for displaying visual threshold setting indicators and threshold activation indicators with information displayed in a graph on a computer display screen. At least one threshold setting indicator is displayed on a first predetermined screen area. Each threshold setting indicator corresponds to a selected threshold setting. Sequential data parameter values are displayed on a graph on a second predetermined screen area. The data parameter values are compared with each selected threshold setting. Responsive to matching compared values, a threshold activation indicator is displayed on a third predetermined screen area. The first predetermined screen area for displaying visual threshold setting indicators is along a first graph axis, such as the vertical graph axis and the third predetermined screen area for displaying threshold activation indicators is along a second graph axis, such as the horizontal graph axis.

12 Claims, 6 Drawing Sheets

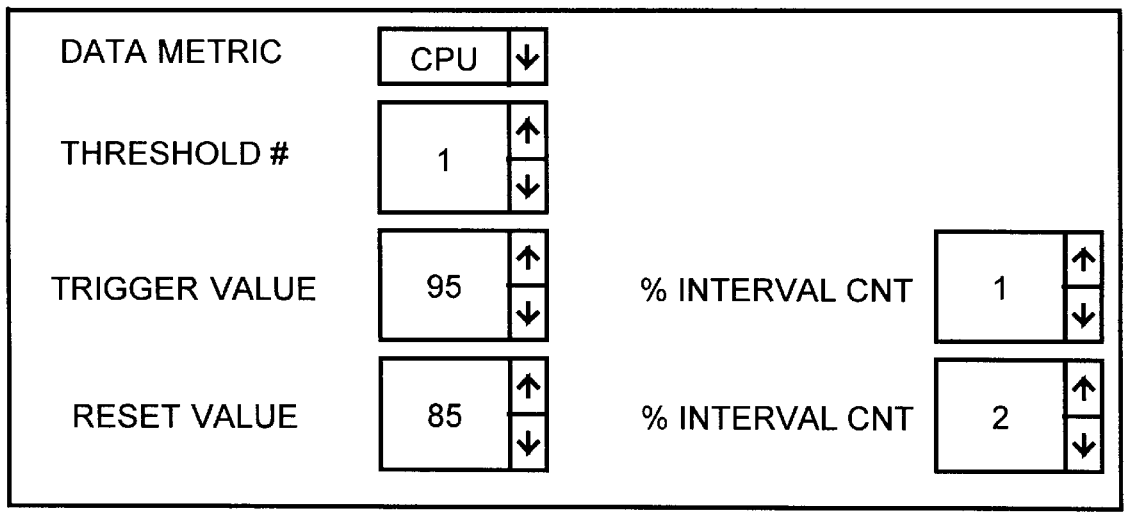
FIG.4
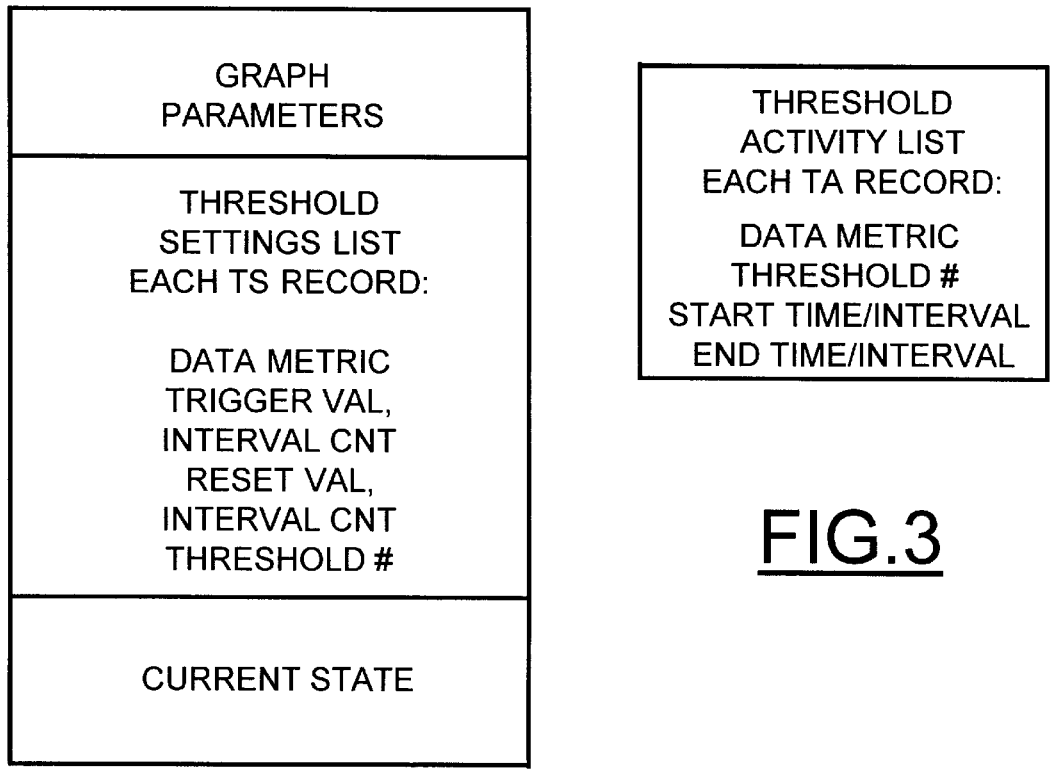
FIG.3
FIG.2

METHOD AND COMPUTER PROGRAM PRODUCT FOR DISPLAYING VISUAL THRESHOLD SETTING INDICATORS AND THRESHOLD ACTIVATION INDICATORS

FIELD OF THE INVENTION

The present invention relates to the data processing field, and more particularly, relates to a method and computer program product for displaying visual threshold setting indicators and threshold activation indicators with information displayed in a graph on a computer display screen.

DESCRIPTION OF THE PRIOR ART

In todays computer systems, information is increasingly shown in a graphical format for reasons of clarity and simplicity. Historical or trend data is frequently plotted through time in a line-graph format. Monitor and control systems will often use this format to indicate how various parameters of a system are behaving through time. Systems that monitor multiple parameters, will often plot the various parameters as different line on the same time graph.

In addition to displaying the parameters on the graph, users also want to set thresholds that will trigger and reset alarms when the parameters go out of their normal bounds. Users would like to have visual indicators as to what the threshold boundaries are defined as, and where the parameters have gone out of bounds or exceeded the threshold boundaries. It is also possible to have multiple threshold conditions on an individual parameter, such as both high and low threshold values.

A need exists for a way to show the threshold settings and the activation periods in a clear and easy to understand format. A need exists for a way to clearly and effectively show threshold settings and activation periods in a multiple line graph, for example, with one or more thresholds per line.

SUMMARY OF THE INVENTION

A principal object of the present invention is to provide improved method and computer program product for displaying visual threshold setting indicators and threshold activation indicators with information displayed in a graph on a computer display screen. Other important objects of the present invention are to provide such improved method and computer program product substantially without negative effects and that overcome many disadvantages of prior art arrangements.

In brief, a method and computer program product are provided for displaying visual threshold setting indicators and threshold activation indicators with information displayed in a graph on a computer display screen. At least one threshold setting indicator is displayed on a first predetermined screen area. Each threshold setting indicator corresponds to a selected threshold setting. Sequential data parameter values are displayed on a graph on a second predetermined screen area. The data parameter values are compared with each selected threshold setting. Responsive to matching compared values, a threshold activation indicator is displayed on a third predetermined screen area.

In accordance with a feature of the invention, the first predetermined screen area for displaying visual threshold setting indicators is along a first graph axis, such as the vertical graph axis and the third predetermined screen area for displaying threshold activation indicators is along a second graph axis, such as the horizontal graph axis.

BRIEF DESCRIPTION OF THE DRAWING

The present invention together with the above and other objects and advantages may best be understood from the following detailed description of the preferred embodiments of the invention illustrated in the drawings, wherein:

FIG. 2 is a chart illustrating graph parameters and a threshold settings list of the preferred embodiment of the system of FIGS. 1A and 1B;

FIG. 3 is a chart illustrating a threshold activation list of the preferred embodiment of the system of FIGS. 1A and 1B;

FIG. 4 is an exemplary diagram illustrating a portion of a display screen of the system of FIGS. 1A and 1B for setting threshold values of the preferred embodiment;

DETAILED DESCRIPTION OF THE PREFERRED EMBODIMENTS

Figure 1A:
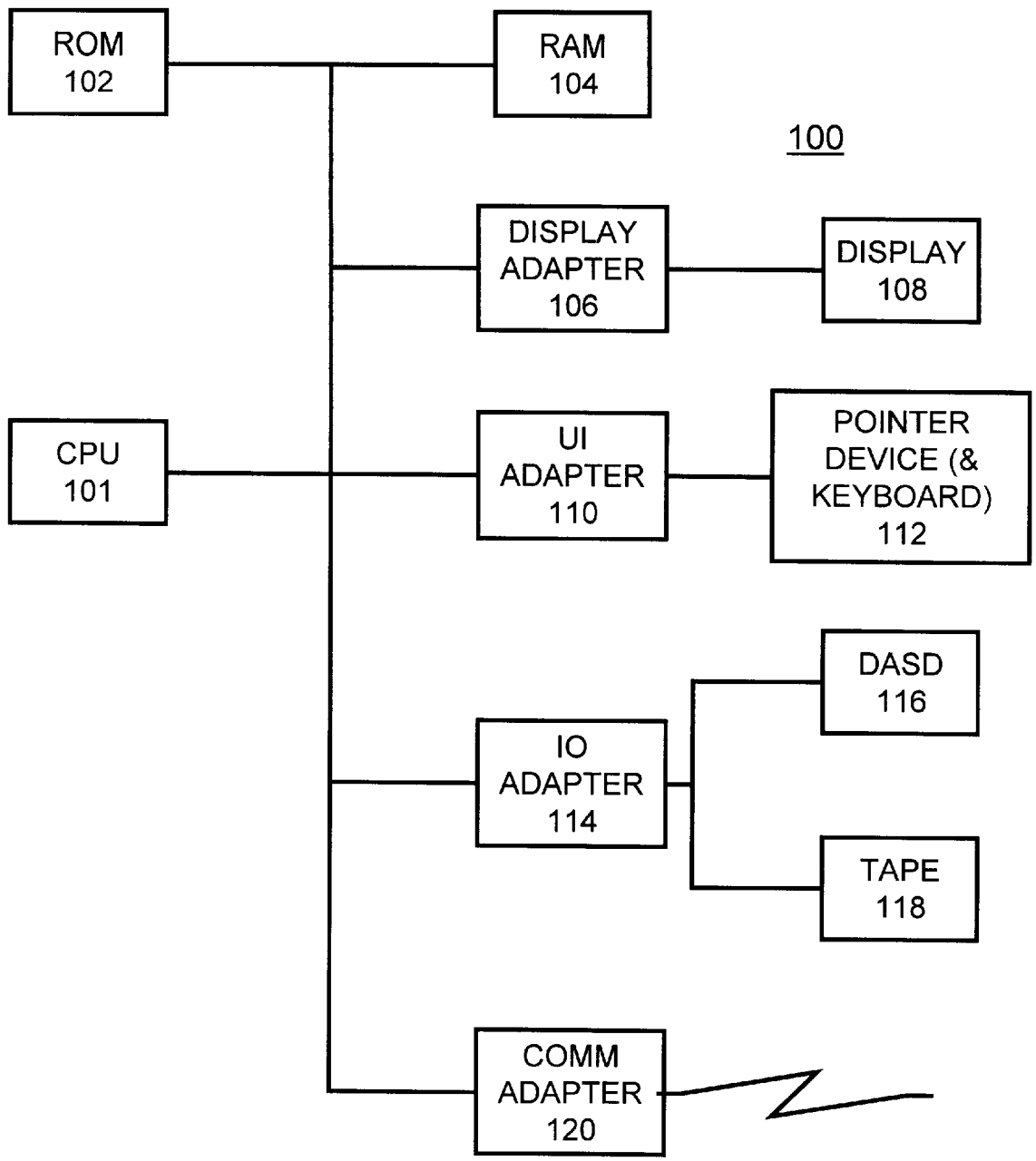
FIGS. 1A and 1B are block diagram representations of a computer or data processing system and of an operation system of the preferred embodiment.
Figure 1B:
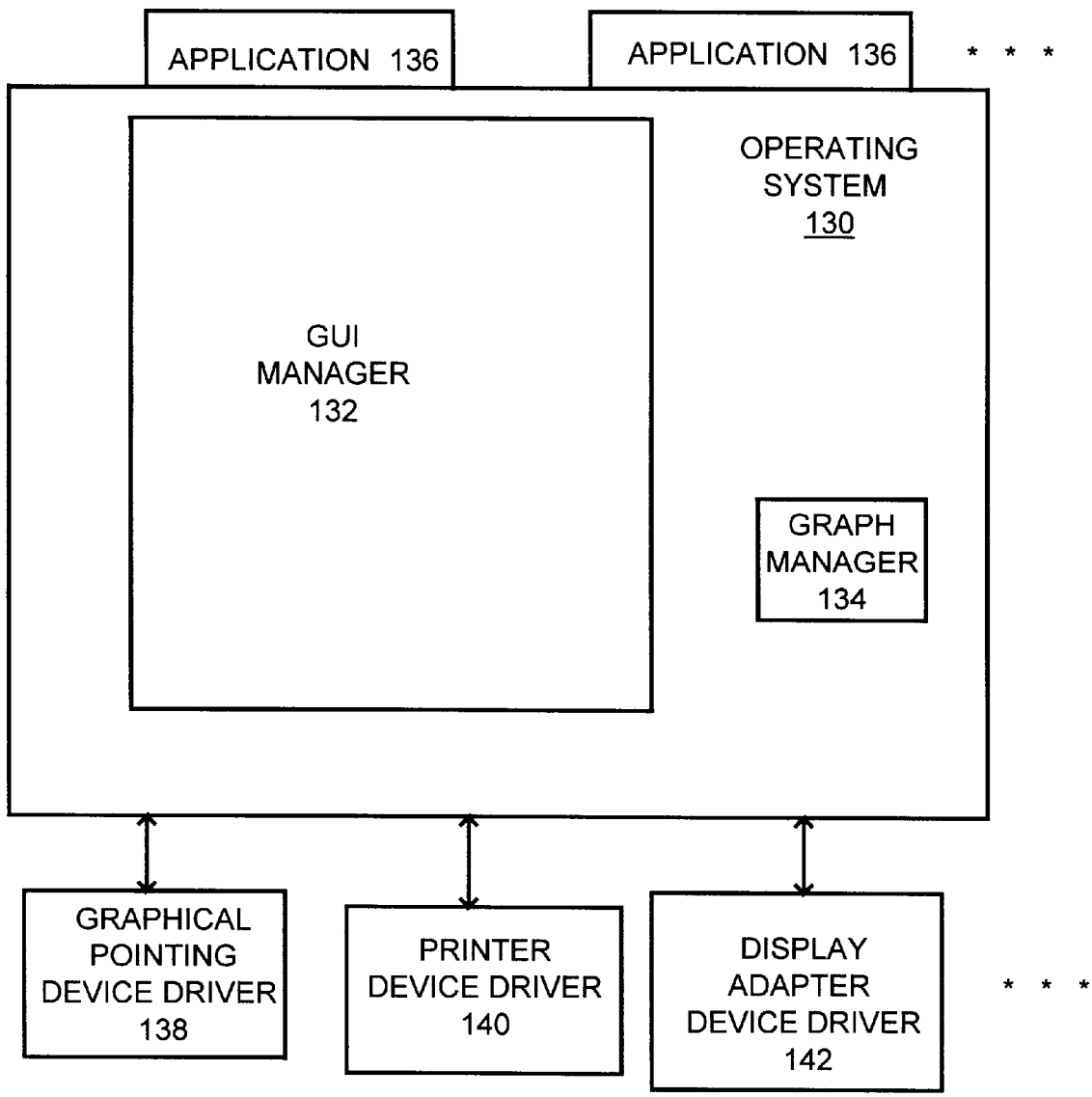

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes an operating system 130 including a graphical user interface (GUI) manager 132 and a graph manager 134 of the preferred embodiment. Multiple applications 136 and multiple device drivers including a graphical pointing device driver 138, a printer device driver 140, and a display adapter device driver 142 are supported by the operating system 130.

Various commercially available processors could be used for computer system 100, for example, an IBM personal computer or similar workstation can be used. Central processor unit 101 is suitably programmed to execute the flowchart of FIGS. 6A and 6B, to maintain the graph parameters of FIGS. 2 and 3, and to generate the display screens of FIGS. 4 and 5 of the preferred embodiment.

Referring to FIGS. 2 and 3, graph parameters maintained in the preferred embodiment for each of a plurality of data metrics are shown. As shown in FIG. 2, a threshold settings list for a data metric includes a record for each threshold setting. Each TS record includes the data metric, a trigger or threshold value and an interval count, a reset value and an interval count, and a current state value. As shown in FIG.

3, a threshold activation list for a data metric includes one record for each threshold activation that has occurred. Each TA record includes the data metric, a particular threshold setting number, a start time interval and an end time interval. Each interval count represents the number of data points required for a trigger or a reset.

Referring to FIG. 4, there is shown an exemplary diagram illustrating a display screen for setting threshold values of the preferred embodiment. A user selects a data metric and a selected number (1–n) of threshold settings per data metric. The threshold setting is characterized by having both a trigger and reset value. The trigger value is the value that causes the threshold condition to be activated, while the reset value is the value that terminates the activation of the threshold setting. For each threshold settings, the user selects a trigger value and associated interval count and a reset value and associated interval count.

Figure 5:
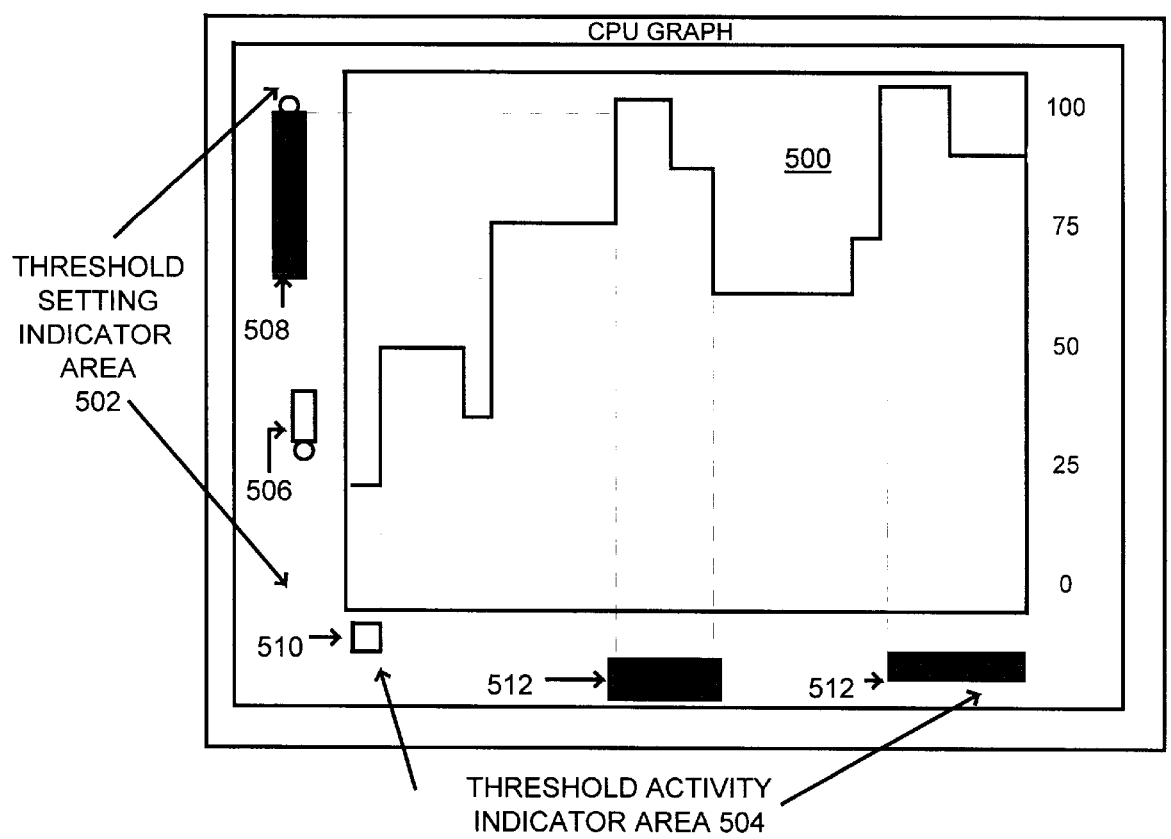
FIG. 5 is an exemplary diagram illustrating a portion of a display screen of the system of FIGS. 1A and 1B including visual threshold setting indicators and threshold activation indicators with information displayed in a graph of the preferred embodiment.

FIG. 5 shows an example of a graph 500 of the preferred embodiment. In accordance with features of the invention, as shown in FIG. 5, threshold setting indicators are displayed in a predetermined screen area 502 on the left side of the graph, and threshold activation indicators are displayed in a predetermined screen area 504 on the bottom of the graph. The threshold setting indicators 506 and 508 and the corresponding threshold activation indicators 510 and 512 appear as bars and are staggered from center to edge so they can easily be distinguished from each other. The threshold setting indicators 506 and 508 and the corresponding threshold activation indicators 510 and 512 provide visual cues to the associated parameter graph-line, such as being colored the same color as the associated parameter graph-line. This feature allows a user to identify which indicators 506, 508, 510 and 512 are associated with each parameter graph-line in a graph including multiple monitored parameters.

When the trigger is greater than the reset value, this is called a high-end threshold setting, for example, as represented by threshold setting indicator 508. This means that the activation occurs when the current value becomes greater than the trigger and is reset when it finally becomes less than the reset value, for example, as represented by threshold activation indicators 512. Similarly, if the trigger is less than the reset value, this is called a low-end threshold, for example, as could be represented by threshold setting indicator 506. This means that the activation occurs when the current value becomes less than the trigger and is reset when it becomes greater than the reset value. Various visual cues can be used to distinguish the type of threshold setting, such as by using distinctive patterns within the threshold setting and activation indications 506, 508, 510, 512 or, such as by placing a hash mark, circle or other visual cue on the end of the solid bar associated with a trigger value.

When a threshold reaches the triggered state, a corresponding threshold activation indicator 510 or 512 appears in area 504 on the bottom of the graph, for example, in the same relative position as the corresponding threshold setting indicator 508 or 506, respectively. The activation indicator 510, 512 appears as an unbroken or continuous bar until the threshold is reset. Each time a threshold is triggered, a new bar or threshold activation indicator 510 or 512 is initiated. The threshold activation indicators 510, 512 illustrate exactly the intervals when the corresponding threshold settings 5508, 506 were activated.

Figure 6A:
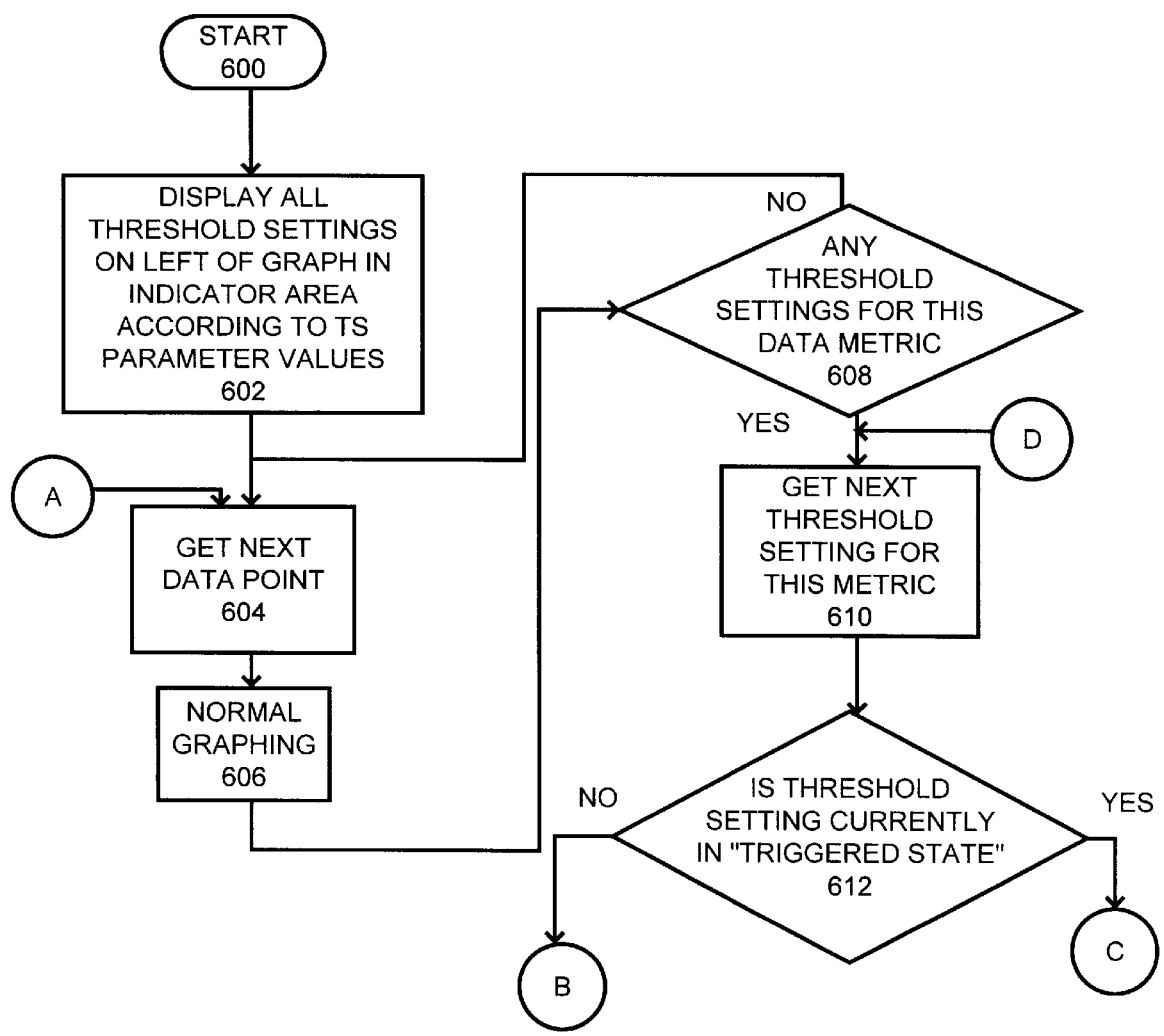
FIG. 6A and 6B together provide a logic flow diagram illustrating the method and computer program product of the preferred embodiment.
Figure 6B:
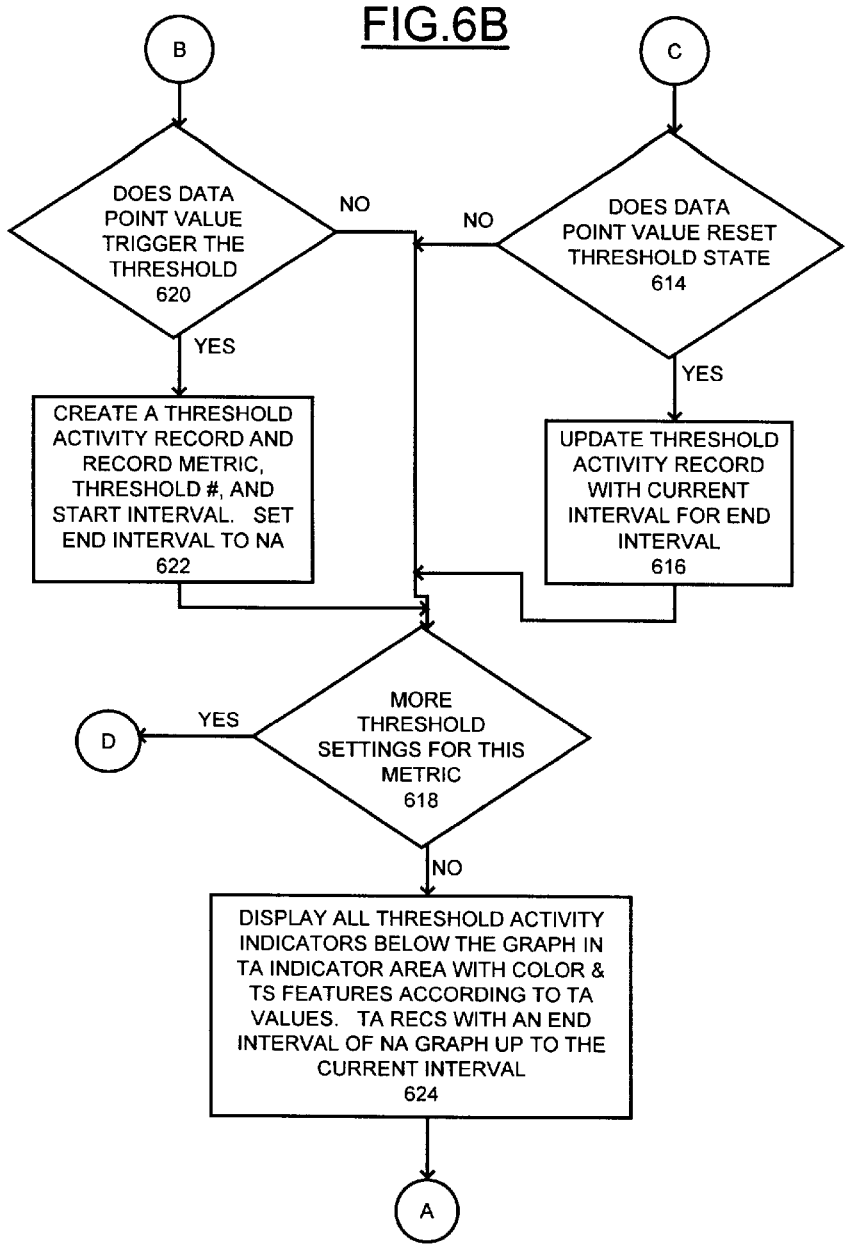

In FIGS. 6A, and 6B, exemplary sequential steps for implementing graph display management of the preferred embodiment performed by the central processor unit 101 begin as indicated at a block 600. At block 602, graph manager 134 displays all the threshold settings in the threshold setting indicator area 502 according to user selected threshold setting parameter values. At block 604, graph manager 134 gets the next data point for a particular data metric being displayed in a graph. At block 606, graph manager 134 performs normal graph processing for the displayed graph. At block 608 graph manager 134 checks whether there are any threshold settings for this data metric. If there are not threshold settings for this data metric, then graph manager 134 returns to block 604 and continues looping through blocks 604, 606, and 608 until there is a threshold setting is identified for the current data metric.

When the check at block 608 is satisfied, so that there is at least one threshold setting for this data metric, then graph manager 134 continues to block 610 where it gets the next threshold setting for this metric. Flow then continues to block 612, where graph manager 134 checks whether the threshold setting for this data metric is currently in the triggered state.

Referring also to FIG. 6B, if the check block 612 is true, then graph manager 134 continues to block 614 following entry point C where it checks whether the data point value resets the threshold state. If the check at block 614 is true, then graph manager 134 continues to block 616 where it updates the threshold activation record with the current interval identified as the end interval for the threshold activation indicator. Flow then continues to block 618 where graph manager 134 checks whether there are more threshold settings for this data metric. If there are more threshold settings for this data metric, then graph manager 134 returns to block 610 in FIG. 6A.

If the threshold setting is not currently in the triggered state at block 612 in FIG. 1A, then graph manager 134 checks whether the data point value has triggered the threshold at block 620. If the data point value has not triggered the threshold then graph manager 134 continues to block 618, as described above. If the data point value has triggered the threshold, then graph manager 134 continues to block 622 where it creates a threshold activation record and a record metric for the corresponding threshold number, and starts the interval. At this point, graph manager 134 also sets the end interval to not applicable (NA).

Flow of graph manager 134 continues to block 624. Also if there are no more threshold settings for this metric at block 618, then graph manager 134 continues to block 624 where it displays all threshold activation indicators in the indicator area 504 according to threshold activation values; all threshold activation records or indicators with an end interval of NA will now graph up to the current interval. Flow of graph manager 134 now returns to block 604 in FIG. 1A.

Figure 7:
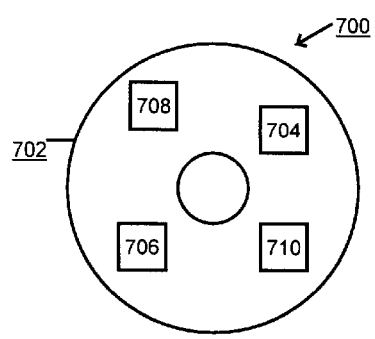
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods of the preferred embodiment in the system 100 of FIGS. 1A and 1B.

A sequence of program instructions or a logical assembly of one or more interrelated modules defined by the recorded program means 704, 706, 708, 710, direct the computer system 100 for implementing graph display management of the preferred embodiment.

While the present invention has been described with reference to the details of the embodiments of the invention shown in the drawing, these details are not intended to limit the scope of the invention as claimed in the appended claims.

What is claimed is:

1. A computer-implemented method of displaying information on a computer display screen, said method comprising the steps of:

displaying at least one threshold setting indicator on a first predetermined screen area; each said at least one threshold setting indicator corresponding to a selected threshold setting;

displaying sequential data parameter values on a graph on a second predetermined screen area;

comparing said data parameter values with said selected threshold setting; and responsive to matching compared values, displaying a threshold activation indicator on a third predetermined screen area; said step of displaying said at least one threshold setting indicator on said first predetermined screen area includes displaying visual cues corresponding to a data metric along a first graph axis and said step of displaying said threshold activation indicator on said third predetermined screen area includes displaying visual cues corresponding to said threshold setting indication along a second graph axis.

2. The computer-implemented method of displaying measured data on a computer screen as recited in claim 1 includes the step of: receiving a user selected threshold setting including a threshold number.

3. The computer-implemented method of displaying measured data on a computer screen as recited in claim 2 includes the step of: receiving a user selected threshold setting including a trigger value and an interval value for the user selected trigger value.

4. The computer-implemented method of displaying measured data on a computer screen as recited in claim 2 includes the step of: receiving a user selected threshold setting including a reset value and an interval value for the user selected reset value.

5. The computer-implemented method of displaying measured data on a computer screen as recited in claim 1 wherein the step of displaying at least one threshold setting indicator on a first predetermined screen area includes the step of: displaying each said at least one threshold setting indicator with a visual cue distinguishing a trigger value and a reset value.

6. The computer-implemented method of displaying measured data on a computer screen as recited in claim 1 wherein said step of comparing said data parameter values with said selected threshold setting includes the steps of comparing said data parameter values with a trigger value and with a reset value.

7. A computer-implemented method of displaying measured data on a computer screen, said method comprising the steps of:

displaying at least one threshold setting indicator on a first predetermined screen area; each said at least one threshold setting indicator corresponding to a selected threshold setting;

displaying sequential data parameter values on a graph on a second predetermined screen area;

comparing said data parameter values with said selected threshold setting including comparing said data parameter values with a trigger value and with a reset value;

responsive to matching compared values, displaying a threshold activation indicator on a third predetermined screen area; and wherein the step of displaying a threshold activation indicator on a third predetermined screen area includes the step of: maintaining said displayed threshold activation indicator until a matching reset value is identified.

8. A computer program product for use in a computer system having a central processor for implementing graph display management on a user interface display screen, the computer program product comprising:

a recording medium;

means, recorded on the recording medium, for displaying at least one threshold setting indicator on a first predetermined screen area including visual cues corresponding to a data metric for said threshold setting indicator, said first predetermined screen area being along a first graph axis of a graph to be displayed; each said at least one threshold setting indicator corresponding to a selected threshold setting;

means, recorded on the recording medium, for displaying sequential data parameter values on said graph on a second predetermined screen area;

means, recorded on the recording medium, for comparing said data parameter values with said selected threshold setting; and means, recorded on the recording medium, for responsive to matching compared values, displaying a threshold activation indicator on a third predetermined screen area along a second graph axis of said graph including visual cues corresponding to said threshold setting indication.

9. The computer program product for use in a computer system having a central processor for implementing graph display management on a user interface display screen as recited in claim 8 includes means, recorded on the recording medium, for receiving a user selected threshold setting, said user selected threshold setting including a threshold number, a trigger value and an interval value for the trigger value, a reset value and an interval value for the reset value.

10. The computer program product for use in a computer system having a central processor for implementing graph display management on a user interface display screen as recited in claim 8 wherein said threshold activation indication displaying means include means, recorded on the recording medium, for displaying said threshold activation indicator with visual cues corresponding to said threshold setting indication.

11. The computer program product for use in a computer system having a central processor for implementing graph display management on a user interface display screen as recited in claim 8 wherein said data parameter value comparing means includes means, recorded on the recording medium, for comparing said data parameter values with a trigger value and with a reset value.

12. A computer program product for use in a computer system having a central processor for implementing graph display management on a user interface display screen, the computer program product comprising:

a recording medium;

means, recorded on the recording medium, for displaying at least one threshold setting indicator on a first predetermined screen area; each said at least one threshold setting indicator corresponding to a selected threshold setting;

means, recorded on the recording medium, for displaying sequential data parameter values on a graph on a second predetermined screen area;

means, recorded on the recording medium, for comparing said data parameter values with said selected threshold setting; said data parameter value comparing means including means, recorded on the recording medium, for comparing said data parameter values with a trigger value and with a reset value;

means, recorded on the recording medium, responsive to matching compared values for displaying a threshold activation indicator on a third predetermined screen area; and wherein said threshold activation indicator displaying means includes means, recorded on the recording medium, for maintaining said displayed threshold activation indicator until a matching reset value is identified.

* * * * *